United States Patent
Okuni et al.

(10) Patent No.: US 7,778,358 B2
(45) Date of Patent: Aug. 17, 2010

(54) RECEIVER, WIRELESS DEVICE AND METHOD FOR CANCELLING A DC OFFSET COMPONENT

(75) Inventors: Hidenori Okuni, Kawasaki (JP); Rui Ito, Chigasaki (JP); Hiroshi Yoshida, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 516 days.

(21) Appl. No.: 11/851,851

(22) Filed: Sep. 7, 2007

(65) Prior Publication Data

US 2008/0198949 A1    Aug. 21, 2008

(30) Foreign Application Priority Data

Feb. 21, 2007  (JP) .............................. 2007-041260

(51) Int. Cl.
*H04L 25/06* (2006.01)
*H04L 25/10* (2006.01)

(52) U.S. Cl. ..................... 375/319; 375/316; 375/317; 375/345

(58) Field of Classification Search ................. 375/316, 375/317, 345
See application file for complete search history.

(56) References Cited

U.S. PATENT DOCUMENTS 6,400,318 B1    6/2002  Kasami et al.
6,816,712 B2 *  11/2004  Otaka et al. .................. 455/83
7,245,894 B2 *  7/2007  Sekiguchi et al. ........ 455/242.1
2008/0181334 A1  7/2008  Okuni et al.

FOREIGN PATENT DOCUMENTS

| JP | 2001-160708 | 6/2001 |
| JP | 2002-94346 | 3/2002 |
| JP | 2007-110765 | 4/2007 |
| JP | 2007-151160 | 6/2007 |

* cited by examiner

*Primary Examiner*—Ted M Wang
(74) *Attorney, Agent, or Firm*—Oblon, Spivak, McClelland, Maier & Neustadt, L.L.P.

(57) ABSTRACT

A receiver includes a memory for storing DC offset amounts generated by an analog circuit; an amplifier; a DC offset amount generator for generating a first offset value and a second offset value to be removed from the received signal amplified at the amplifier; a first DC offset component-removing unit for removing the first DC offset value from the received signal before the amplifier; a second DC offset component-removing unit for removing the second DC offset value from the received signal after the amplifier; and an updating unit for updating the DC offset amount stored in the memory in view of the second DC offset value generated by the DC offset amount generator. A maximum value of the second DC offset value is set larger than a multiplication value of a gain of the amplifier by a minimum resolution value of the first DC offset value.

20 Claims, 9 Drawing Sheets

RECEIVER, WIRELESS DEVICE AND METHOD FOR CANCELLING A DC OFFSET COMPONENT

CROSS-REFERENCE TO RELATED APPLICATIONS

This application is based upon and claims the benefit of priority from the prior Japanese Patent Application No. 2007-41260, filed on Feb. 21, 2007; the entire contents of which are incorporated herein by reference.

BACKGROUND OF THE INVENTION

1. Field of the Invention

The present invention relates to receiving technique in wireless communication, particularly, to a receiver to remove a DC offset component remaining in a received signal, a wireless device using the receiver and a method for cancelling a DC offset component.

2. Description of the Related Art

With a wireless device such as a receiver to be employed in wireless communication, a direct conversion system to directly convert the frequency of a signal received is widely available. With the direct conversion system, since the received signal is multiplied by a local signal to gain an intended baseband signal, a DC offset component may be generated originated from the leak of the local signal so as to deteriorate the receiving performance of the wireless device. In this point of view, it is required that the DC offset component is removed.

Generally, the DC offset component is removed by means of a DC offset canceller. For example, the DC offset canceller may be configured such that the amounts of DC offsets are measured over the range of amplification gain of the intended baseband signal, and stored in a memory per amplification gain. Namely, when the amplification gain is switched, the corresponding DC offset amount is read out from the memory and subtracted from the signal output through the amplifier (Reference 1).

[Reference 1] JP-A 2002-94346 (KOKAI)

In the conventional DC offset canceller as described above, the DC offset component, generated at the amplifier, is removed at the output side of the amplifier. In this point of view, therefore, the DC offset component generated at the input side of the amplifier such as a DC offset component generated at the frequency converter, e.g., to convert a wireless signal into the corresponding baseband signal can not be removed in front of the amplifier in advance. If a signal containing the DC offset component is amplified at the amplifier, the amplification of the signal is saturated due to the DC offset component so that the signal can not be amplified sufficiently. As a result, the receiving performance of the signal may be deteriorated remarkably at the corresponding receiver.

In the case that the gain of the amplifier is high, if the correction value for the DC offset component varies in front of the amplifier after the correction value is converged into a given value, the impulse response may be generated from the amplifier. In this point of view, the receiving performance of the signal may be deteriorated remarkably at the corresponding receiver.

BRIEF SUMMARY OF THE INVENTION

It is an object of the present invention, in view of the above conventional problems, to provide a receiver which can remove a DC offset component from a signal to be received even under the condition of the amplification of the signal, a wireless device using the receiver and the corresponding method of cancelling a DC offset component.

In order to achieve the above object, an aspect of the present invention relates to a receiver including: a memory for storing DC offset amounts generated by an analog circuit; an amplifier for amplifying the received signal; a DC offset amount generator for generating a first offset value to be removed from the received signal amplified at the amplifier and a second offset value to be removed from the received signal after the amplifier in combination with the DC offset amount stored in the memory; a first DC offset component-removing unit for removing the first DC offset value from the received signal before the amplifier; a second DC offset component-removing unit for removing the second DC offset value from the received signal amplified at the amplifier; and an updating unit for updating the DC offset amount stored in the memory in view of the second DC offset value generated by the DC offset amount generator; wherein a maximum value of the second DC offset value generated at the DC offset amount generator is set larger than a multiplication value of a gain of the amplifier by a minimum resolution value of the first DC offset value.

Another aspect of the present invention relates to a wireless device, including: a receiver as defined above for receiving a given receiver signal; a transmitter for transmitting a given transmitter signal and coupled with the receiver; and an antenna for receiving the receiver signal and transmitting the transmitter signal.

Still another aspect of the present invention relates to a method for cancelling a DC offset component, including: storing, in a memory, DC offset amounts generated by an analog circuit in accordance with a DC offset component remaining in a received signal; amplifying the received signal by an amplifier; generating a first offset value to be removed from the received signal before the amplifier and a second offset value to be removed from the received signal after the amplifier in combination with the DC offset amount stored in the memory; removing the first DC offset value from the received signal before the amplifier; removing the second DC offset value from the received signal after the amplifier; and updating the DC offset amount stored in the memory in view of the second DC offset value generated by the DC offset amount generator; wherein a maximum value of the second DC offset value generated at the DC offset amount generator is set larger than a multiplication value of a gain of the amplifier by a minimum resolution value of the first DC offset value.

According to the aspects of the present invention can be removed the DC offset component while the receiving performance can be maintained at the corresponding receiver.

DETAILED DESCRIPTION OF THE INVENTION

Figure 1:
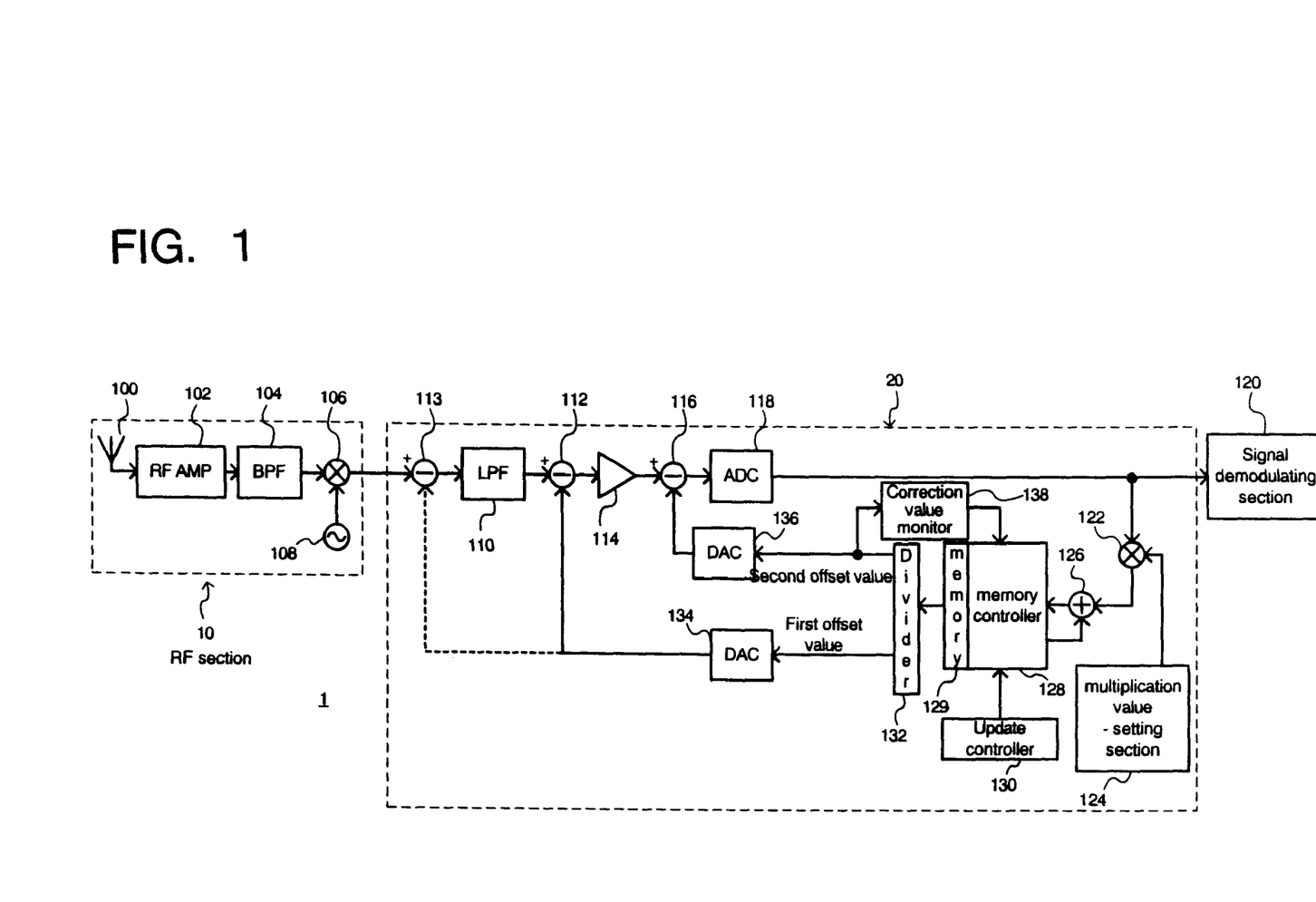
FIG. 1 is a block diagram relating to the structure of the receiver according to a first embodiment.

The embodiments will be described with reference to drawings. FIG. 1 is a block diagram relating to the structure of the receiver according to a first embodiment. As illustrated in FIG. 1, the receiver 1 in this embodiment includes an RF unit 10, a baseband signal processing unit 20, and a signal demodulating unit 120.

The RF unit 10 includes an antenna 100, a high frequency amplifier (RF amplifier) 102, a bandpass filter (BPF) 104, a mixer 106 and a local oscillator 108 so as to convert a received signal into the corresponding baseband signal to be output. The radio wave as the received signal is mainly received by the antenna 100, and amplified to a desired gain level by the RF amplifier 102. In this case, unnecessary frequency components in the received signal are removed by the BPF 104 so that the intended frequency component(s) can be extracted from the received signal after the amplification by the RF amplifier 102. The local oscillator 108 generates a local signal for converting the received signal into the corresponding baseband signal after the BPF 104. The local signal is supplied to the mixer 106. The received signal through the BPF 104 is mixed with the local signal oscillated from the local oscillator 108 at the mixer 106, thereby being converted into the corresponding baseband signal.

The baseband signal processing unit 20 includes a low-pass filter (LPF) 110, a baseband amplifier (amplifier) 114 and a analog-digital converter (ADC) 118 so as to convert the baseband signal received and converted into the corresponding digital signal and supply the digital signal to the signal demodulating unit 120. Furthermore, the baseband processing unit 20 includes subtracters 112/113/116, a multiplier 122, a multiplication value-setting unit 124, an adder 126, a memory controller 128, a memory 129, an update controller 130, a divider 132, a first digital-analog converter (DAC) 134, a second digital-analog converter (DAC) 136 and a correction value monitor 138 so as to remove the DC offset component remaining in the baseband signal.

The LPF 110 removes unnecessary frequency components of the baseband signal converted at the mixer 106 so that the intended frequency component(s) can be extracted from the baseband signal. The amplifier 114 amplifies the baseband signal to a desired gain level enough to digitally convert the baseband signal after the LPF 110. The amplified baseband signal is converted into the digital signal at the ADC 118, and supplied to the signal demodulating unit 120.

The subtracters 112/113 are connected with the input of the amplifier 114 so as to remove the DC offset component contained in the baseband signal. Concretely, the subtracter 112 is connected with the input of the amplifier 114 and the output of the LPF 110 so as to remove the DC offset component contained in the baseband signal output from the LPF 110. The subtracter 113 is connected with the output of the mixer 106 and the input of the LPF 110 so as to remove the DC offset component contained in the baseband signal output from the mixer 106. In this embodiment, although both of the subtracters 112 and 113 are provided, either of the subtracters 112 and 113 may be provided.

The subtracter 116 is disposed at the output of the amplifier 114 so as to remove the DC offset component contained in the baseband signal. Concretely, the subtracter 116 is connected with the output of the amplifier 114 and the input of the ADC 118 so as to remove the DC offset component contained in the baseband signal amplified by the amplifier 114.

The multiplier 122 multiplies the baseband signal digitally converted at the ADC 118 by the multiplication value supplied from the multiplication value-setting unit 124. The multiplication value supplied from the multiplication value-setting unit 124 is a coefficient to control the period of time for removing the DC offset component. The multiplication value-setting unit 124 may configured such that the multiplication value can be retained in the self-memory installed therein or defined dynamically and externally. The adder 126 adds the signal multiplied at the multiplier 122 to a predetermined value stored in the memory 129. The thus obtained added value is transmitted to the memory controller 128. In this case, the adder 126 functions as integrating the DC offset component remaining in the baseband signal (received signal).

The memory controller 128 functions as storing data in the memory 129 and reading out the data from the memory 129. In this case, the memory controller 128 stores the data added (integrated) at the adder 126 in the memory 129 and reads out the data from the memory 129. The read out data is transmitted to the divider 132 by the memory controller 128. Moreover, the memory controller 128 is configured such that the read/write of the data in the memory 129 can be controlled on the indication signal from the update controller 130. In addition, the memory controller 128 is also configured such that the data stored in the memory 129 is updated on the indication signal from the correction value monitor 138 (which will be described later).

The divider 132 is configured so as to read out the data (relating to the DC offset values to be subtracted) and output a first offset value and a second offset value. The first offset value is processed in correction at the subtracter 112 and/or subtracter 113 which are disposed at the input of the amplifier 114. The second offset value is processed in correction at the subtracter 116 which is disposed at the output of the amplifier 114. The relation between the first offset value and the second offset value is determined on the gain of the amplifier 114. The maximum value of the second offset value is defined as a value larger than the multiplication value of the gain of the amplifier 114 by the minimum resolution value (least significant bit (LSB) value) of the first DAC 134. Namely, the second offset value is defined roughly for the DC offset component to be removed.

The first offset value and the second offset value which are output from the divider 132 are converted into the corresponding analog data at the first DAC 134 and the second DAC 136, respectively, and supplied to the subtracters 112/

113 and the subtracter 116, respectively. Namely, the first DAC 134 and the second DAC 136 function as generating the analog offset amounts corresponding to the DC offset components to be removed by the subtracters 112/113 and the subtracter 116, respectively, and supplying the analog offset amounts to the subtracters 112/113 and the subtracter 116, respectively.

The update controller 130 functions as determining the write timing of data, that is, the update timing of data into the memory 129 by the memory controller 128. In other words, the update controller 130 functions as indicating the write/read processing to the memory controller 129. The signal demodulating unit 120 demodulates the baseband signal by a prescribed demodulating method, and thus, restores the corresponding original data.

The correction value monitor 138 monitors the second offset value so that the first offset value and the second offset value can be updated so as to fix the variation degree of the first offset value when the second offset value approaches the limit value of the dynamic range.

Figure 2:
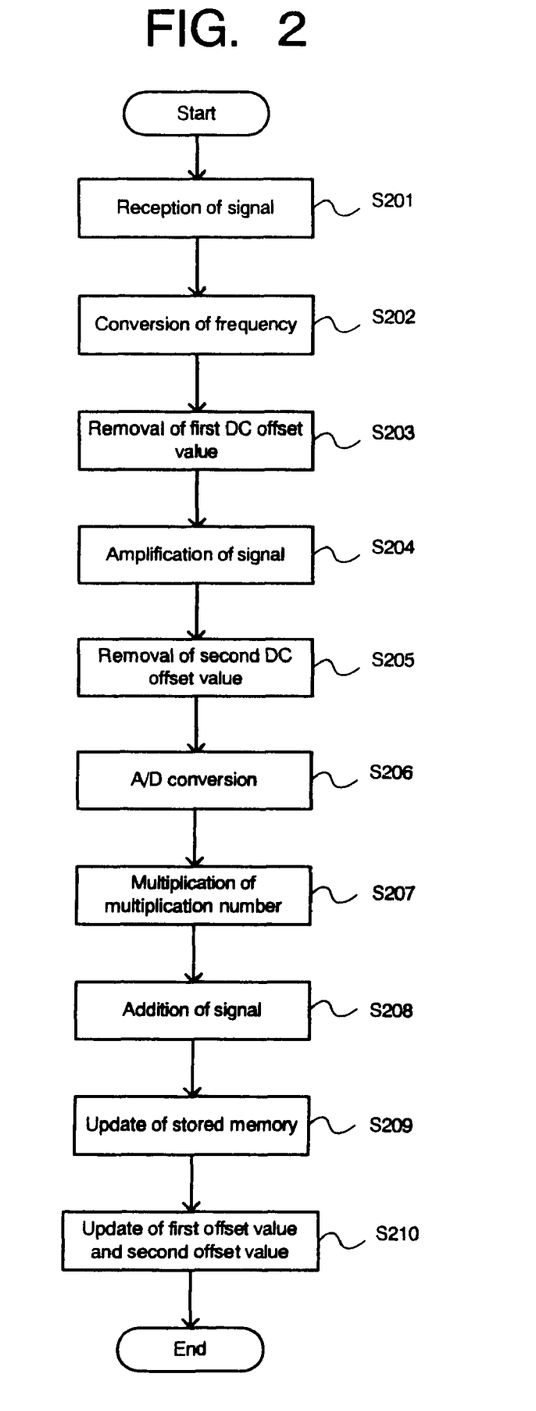
FIG. 2 is a flowchart relating to the operation of the receiver in the first embodiment.

Then, the operation of the receiver 1 will be described hereinafter with reference to FIG. 2. FIG. 2 is a flowchart relating to the operation of the receiver 1 in this embodiment. In this embodiment, suppose that the amount of the DC offset contained in the received signal converted at the mixer 106 is 10.99 and the least significant bit (hereafter, called as a "LSB") representing the accuracies of the DAC 134/140 is 1. Then, suppose that the DC offset amount of 10.99 is stored in the memory 129 in advance and the gain of the amplifier 114 is 100 times. In this case, the first offset value is set to "10" and the second offset value is set to "99". For simplification, the accuracy of the ADC 118 is indefinite (under no quantum error).

The RF amplifier 102 amplifies the received signal by the antenna 100. The amplified signal is transmitted to the BPF 104. (A) predetermined frequency component(s) within a predetermined frequency range can be passed through the BPF 104 (S201). The local oscillator 108 oscillates a local signal for converting the frequency component(s) of the signal through the BPF 104. The local signal is supplied to the mixer 106 from the local oscillator 108. The mixer 106 mixes the received signal (frequency component(s)) through the BPF 104 with the local signal generated at the local oscillator 108 so that the received signal (frequency component(s)) can be converted into the corresponding baseband signal.

The baseband signal through the mixer 106 is input into the subtracter 113 so as to be subtracted by the value (first analog offset value) corresponding to the DC offset amount transmitted from the first DAC 134, and then, transmitted to the LPF 110. Herein, the first DAC 134 supplies the value roughly relating to the DC offset amount (corresponding a value not less than the LSB representing the accuracy of the first DAC 134). Namely, the subtracter 113 removes the DC offset amount corresponding to the value which is operably generated by the first DAC 134 from the converted baseband signal (S203).

The LPF 110 removes unnecessary frequency component(s) from the baseband signal output from the subtracter 113. The baseband signal is input into the subtracter 112 after the LPF 110 so as to be subtracted by the value (first analog offset value) corresponding to the DC offset amount transmitted from the first DAC 134, and then, transmitted to the amplifier 114. The subtracter 112 functions in the same manner as the subtracter 113. Namely, the subtracters 112 and 113 remove the value roughly relating to the DC offset amount from the baseband signal at the input and the output of the LPF 110, respectively. In this point of view, either of the subtracters 112 and 113 may be provided. Since the subtracters 112 and 113 can remove the DC offset amount of 1 or more, the subtracters 112 and 113 can remove the DC offset amount of 10 from the baseband signal. As a result, the DC offset amount of 0.99 remains in the base band signal.

The baseband signal (received signal), transmitted from the subtracter 112 (or the LPF 110), is amplified at the amplifier 114 by a predetermined gain. The amplifier 114 may be configured such that the gain can be controlled in dependence on the amplitude of the baseband signal (received signal) (S204). The remaining DC offset amount of 0.99 is amplified by 100 times at the amplifier 114 so that the amplified baseband signal (received signal) contains the DC offset amount of 0.99×100=99.

The subtracter 116 subtracts the value corresponding to the DC offset amount from the second DAC 136 from the baseband signal (received signal) from the amplifier 114. The DC offset amount from the second DAC 136 is small enough to be a value not more than the LSB representing the accuracy of the second DAC 136 in view of the amplification of the amplifier 114. Namely, the subtracter 116 subtracts the DC offset amount amplified by the amplifier 114 from the baseband signal (received signal) (S205). Since the second multiplication value is set to 99, the DC offset amount of 99 is removed from the DC offset component remaining in the baseband signal amplified by the amplifier 114 through the subtracter 116.

The ADC 118 digitally converts the baseband signal transmitted from the subtracter 116 (S206). The thus obtained digital signal is transmitted to the signal demodulating unit 120 and then, transmitted to the multiplier 122.

The multiplier 122 multiplies the digital signal converted at the ADC 118 by the multiplication value supplied from the multiplication value-setting unit 124. The thus obtained multiplied signal is transmitted to the adder 126 (S207). The adder 126 adds the digital signal multiplied by the multiplication value to a value selected from the memory 129. The thus obtained added signal is transmitted to the memory controller 128 (S208).

The memory controller 128 receives the added signal at a predetermined update timing, and writes the added signal into the memory 129 (S209). The update timing to update the data in the memory 129 by the memory controller 128 is supplied from the update controller 130.

The divider 132 reads out, from the memory 129, the first offset value corresponding to the DC offset amount to be removed by the subtracters 112/113 and the second offset value corresponding to the DC offset amount to be removed by the subtracter 116. The first offset value and the second offset value are supplied to the first DAC 134 and the second DAC 136 from the divider 132, respectively. The first offset value and the second offset value are converted into the corresponding analog data at the first DAC 134 and the second DAC 136, respectively. The thus obtained analog data are transmitted to the subtracters 112/113 and the subtracter 116, respectively. In this case, if the data stored in the memory 129 are rewritten, the first offset value and the second offset value to be subtracted by the subtracters 112/113/116 are also updated (S210).

In this way, in the receiver 1, the DC offset component can be roughly removed by the subtracters 112/113 (by the amount of 10 in this embodiment), and finely removed by the subtracter 116 (by the amount of 99 through the amplification of the amplifier 114 in this embodiment), which means the increase of the accuracy margins of the DACs 134/136 relating to the LSB. Therefore, an expensive DAC is not required. In the receiver 1 of this embodiment, since the subtracters 112/113 and the subtracter 116 are provided at the input and the output of the amplifier 114, respectively, the remaining DC offset component which can not be corrected by the subtracters 112/113 originated from the resolution of the first DAC 134 which are provided at the input of the amplifier 114 can be removed by the subtracter 116 which is provided at the output of the amplifier 114. In other words, since the remaining DC offset component can be removed from the baseband signal after amplifier 114, the receiving performance of the receiver 1 can be improved. Herein, the remaining DC offset component and the baseband signal are equally amplified by the amplifier 114.

Figure 3:
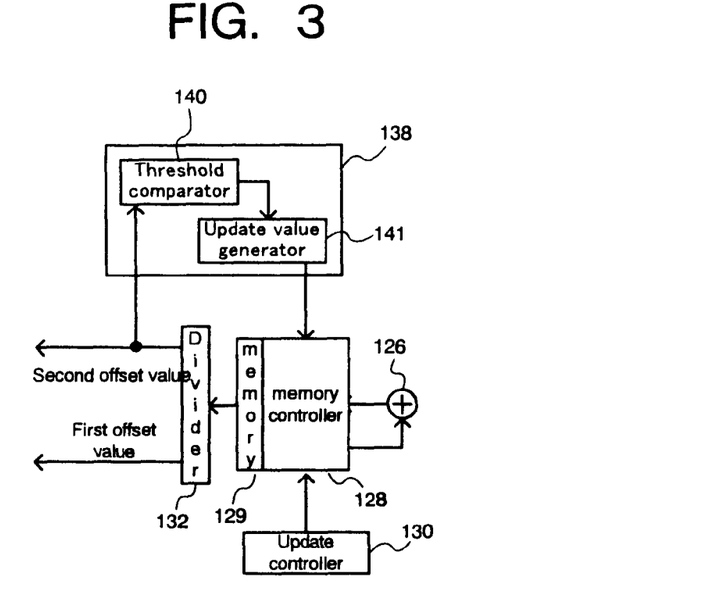
FIG. 3 is a flowchart relating to the structure of the correction value monitor in the receiver of the first embodiment.
Figure 4:
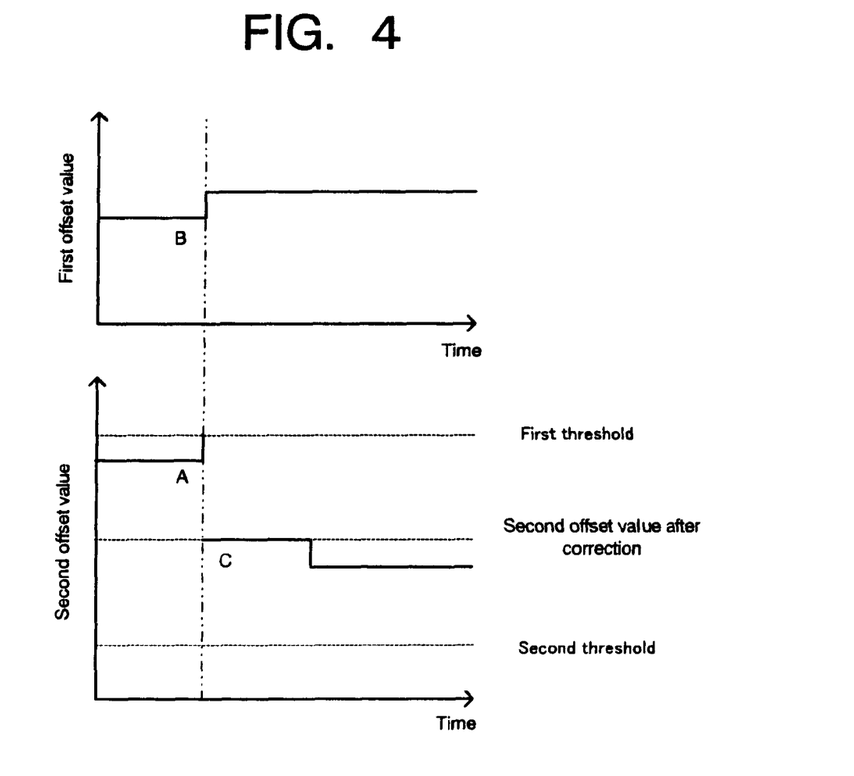
FIG. 4 is an explanatory view for the fluctuation in a first offset value and a second offset value of the receiver of the first embodiment.
Figure 5:
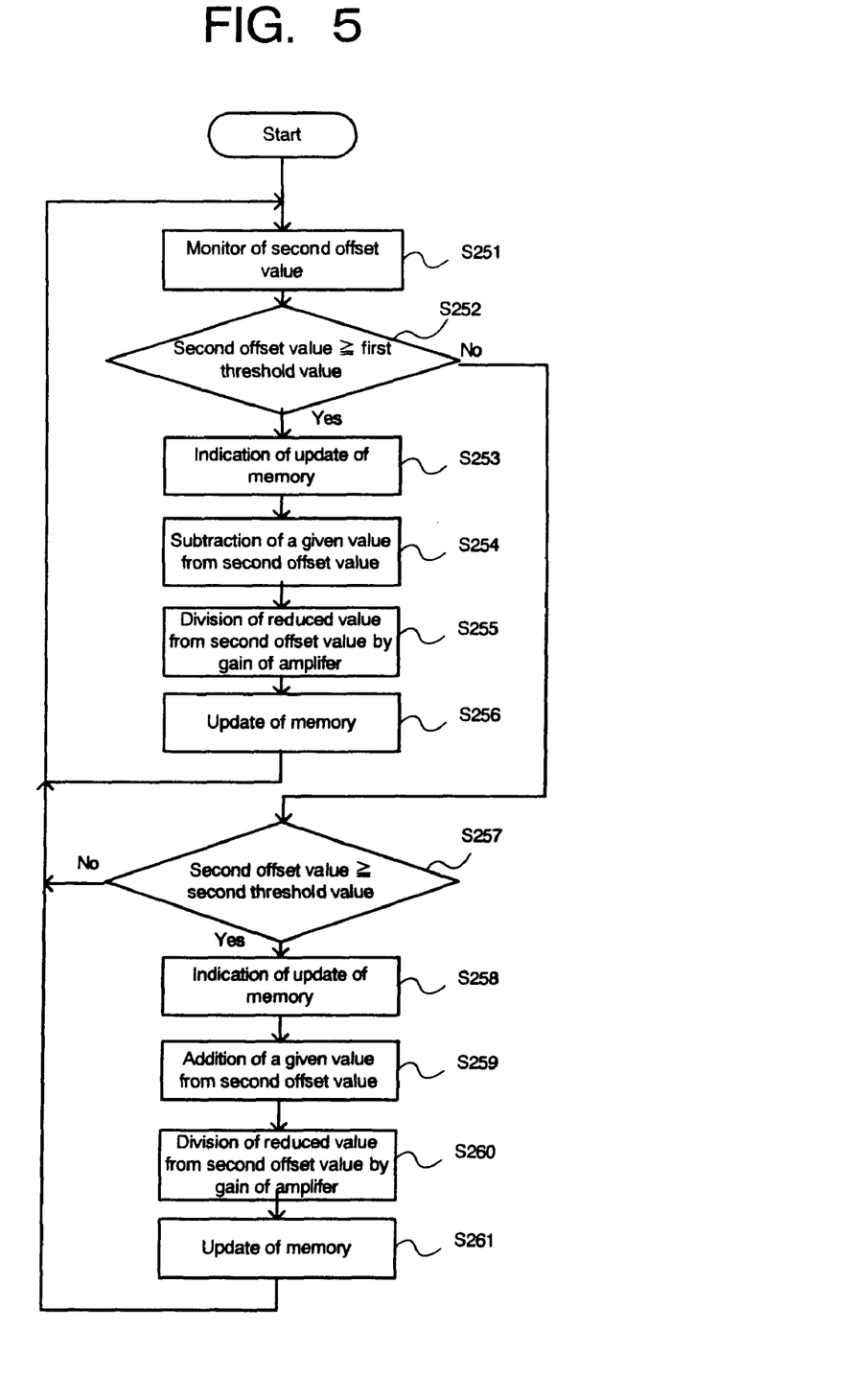
FIG. 5 is a flowchart relating to the operation of the correction value monitor in the receiver of the first embodiment.

Then, the correction value monitor 138 in the receiver 1 of the first embodiment will be described in detail hereinafter with reference to FIGS. 3 to 5. FIG. 3 is a flowchart relating to the structure of the correction value monitor 138 in the receiver 1 of the first embodiment. FIG. 4 is an explanatory view for the fluctuation in the first offset value corresponding to the DC offset amount to be subtracted by the subtracters 112/113 and the second offset value corresponding to the DC offset amount to be subtracted by the subtracter 116 in the receiver 1 of the first embodiment. FIG. 5 is a flowchart relating to the operation of the correction value monitor 138 in the receiver 1 of the first embodiment.

As shown in FIG. 3, the correction value monitor 138 in this embodiment includes a threshold value comparator 140 and an update value generator 141. The threshold value comparator 140 compares a predetermined threshold value stored therein with the second offset value output from the divider 132. In the comparison, when the second offset value varies to a given threshold value and becomes beyond the threshold value, the threshold value comparator 140 indicates the update of the first offset value and the second offset value for the update value generator 141. The update value generator 141 updates the first offset value and the second offset value on the indication from the threshold value comparator 140. The updated first offset value and the second offset value are transmitted to the memory controller 128 from the update value generator 141.

Then, an operation of the correction value monitor 138 will be described. In this embodiment, suppose that the gain of the amplifier 114 is set to "8", the resolutions of the DACs 134 and 136 are set to 5 bits, respectively, and the minimum resolution value (corresponding to the output value of 1LSB) is set to "1". As a result, the maximum value of the second offset value is set to "15" (if expressed by binary number, "1111") which is larger than the multiplication value (8×1=8) of the gain of the amplifier 114 by the minimum resolution value of the first DAC 134. Suppose that the first threshold value is set to "15", the second threshold value is set to "0" and the newly defined second offset value is set to "14" when the original second offset value approaches to the threshold value. In this embodiment, the operation of the correction value monitor 138 will be described concretely when the DC offset component to be generated in the circuit of the receiver 1 changes due to the change in temperature and the like under the condition that the first offset value is set to "7" and the second offset value is set to "14" so that the total DC offset amount to be removed from the DC offset component is converged into a given value.

The threshold value comparator 140 retains the maximum value of the second offset value (corresponding to the first threshold value) and the minimum value of the second threshold value (corresponding to the second threshold value) in the memory thereof, and monitors the second offset value (S251). The threshold value comparator 140 compares the second offset value with the first threshold value (S252).

As the result of the comparison, when the second offset value is not less than the first threshold value (corresponding to the indication "Yes" at S252), the threshold value comparator 140 indicates the reduction of the second offset value and the update of the first offset value to the update value generator 141. FIG. 4 shows the state that the second offset value varies at the point A and approaches the first threshold value. Namely, the second offset value is increased from "14" to "15" corresponding to the first threshold value.

The update value generator 141 subtracts a given value from the second offset value on the indication of the reduction of the second offset value (S254). As the result of the subtraction (correction), the second offset value is set to "7" which is originally defined.

Then, the update value generator 141 divides the given value reduced from the second offset value at S254 by the gain of the amplifier 114. The thus obtained divided result (value) is defined as an updated value of the first offset value. The division by the gain of the amplifier 114 is originated from that the second offset value is subtracted from the remaining DC offset value amplified by the amplifier 114. When the update value of the first offset value is calculated, the update value generator 114 transmits the update value of the first offset value and the reduced second offset value to the memory controller 128. As the result of the division, the first offset value is increased slightly. Namely, since the given value (15−7=8) reduced from the second offset value at S254 is divided by the gain of "8", the update value of the first offset value becomes "1" (8/8=1). The update value of the first offset value of "1" and the reduced second offset value of "7" are transmitted to the memory controller 128 from the update value generator 141.

The memory controller 128 stores, in the memory 129, the updated first offset value and the reduced second offset value as a new first offset value and a new second offset value (S256). As a result, as shown in FIG. 4, the first offset value is increased slightly at the point B and the second offset value is decreased at the point C. Namely, since the update value of the first offset value is "1", the updated first offset value becomes "8" (7+1=8) and the updated second offset value becomes "7" corresponding to the reduced second offset value.

After the data stored in the memory 129 is updated, the threshold value comparator 140 continues to monitor the second offset value (S251).

On the other hand, in the case that the second offset value is less than the first threshold value as the result of the comparison (corresponding to the indication "No" at S252), the threshold comparator 140 compares the second offset value with the second threshold value (S257).

As the result of the comparison, in the case that the second offset value is not more than the second threshold value (corresponding to the indication "Yes" at S257), the threshold value comparator 140 indicates the increase of the second offset value and the update of the first offset value for the update value generator 141 (S258).

The update value generator 141 adds a given value to the second offset value on the indication from the threshold value comparator 140.

Then, the update value generator 141 divides the given value added to the second offset value by the gain of the amplifier 114 so as to generate an update value of the first offset value (S260). When the update value of the first offset value is calculated, the update value generator 141 transmits the update value of the first offset value and the added second offset value to the memory controller 128. As the result of the division, the first offset value is decreased slightly.

The memory controller 128 calculates a new first offset value in view of the update value, and stores the new first offset value and the added second offset value as a new second offset value into the memory 129 (S261). After the data stored in the memory 129 is updated, the threshold value comparator 140 continues to monitor the second offset value (S251).

In this way, in the receiver 1 of this embodiment, since the first offset value and the second offset value are corrected in accordance with the original second offset value monitored by the correction value monitor 138 (threshold value comparator 140), the second offset value can be set within a range of the first threshold value through the second threshold value. Therefore, the variation of the second offset value can be reduced so that pulsed noise generation can be reduced and thus, the receiving performance can be improved.

Figure 6:
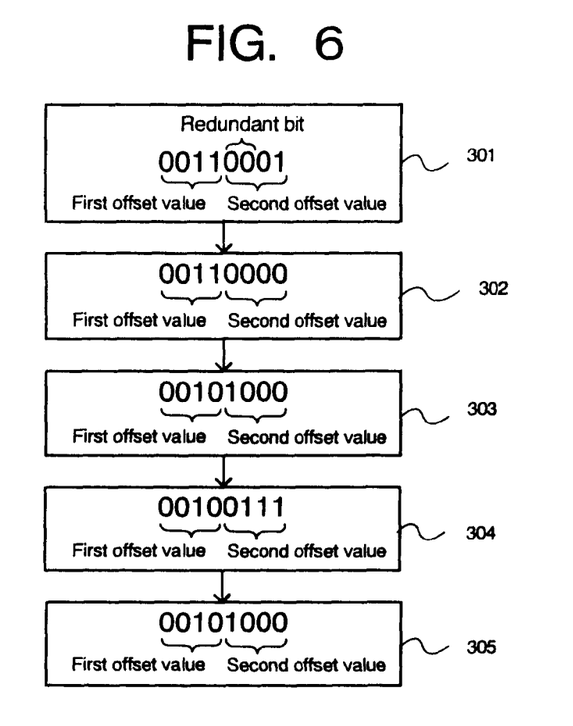
FIG. 6 is a conceptual view relating to the first offset value and the second offset value in the receiver of the first embodiment.
Figure 7:
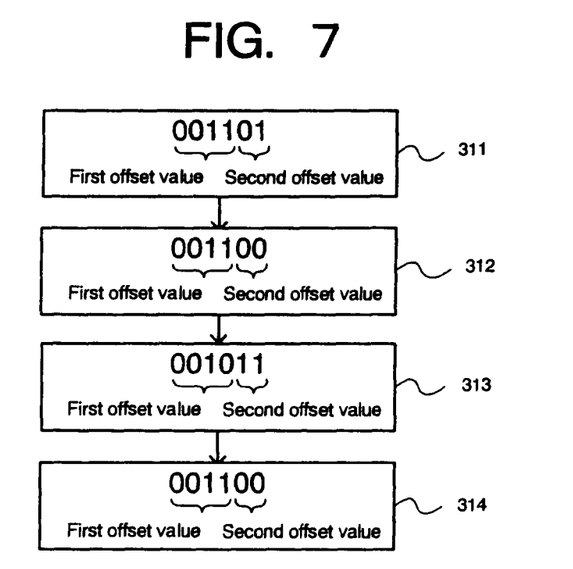
FIG. 7 is a conceptual view relating a first offset value and a second offset value in a receiver without the correction value monitor.

Then, another operation of the correction value monitor 138 will be described with reference to FIGS. 6 and 7. FIG. 6 is a conceptual view relating to the first offset value and the second offset value in the receiver 1 of the first embodiment. FIG. 7 is a conceptual view relating a first offset value and a second offset value in a receiver without the correction value monitor.

In this embodiment, suppose that the gain of the amplifier 114 is set to "4" ($=2^2$) and the resolutions of the DACs 134 and 136 are set to 4 bits, respectively. As a result, the maximum value of the second offset value is set to "15" (if expressed by binary number, "1111") which is larger than the gain of the amplifier 114. Suppose that the first threshold value is set to "15" (if expressed by binary number, "1111"), the second threshold value is set to "0" (if expressed by binary number, "0000") and the newly defined second offset value is set to "8" through correction (if expressed by binary number, "1000") when the original second offset value is set within a range of the first threshold value through the second threshold value. In this embodiment, the operation of the correction value monitor 138 will be described concretely under the condition that the first offset value is set to "3" (if expressed by binary number, "0011") and the second offset value is set to "1" (if expressed by binary number, "0001") so that the total DC offset amount to be removed from the DC offset component is converged into a given value. In this case, the binary number of "00110001" is stored in the memory 129 (S301).

Suppose that the DC offset component to be generated in the circuit of the receiver 1 is varied by "−1" due to the change in temperature, etc. and thus, the binary number stored in the memory 129 is varied from "00110001" to "00110000" through the switching of the data stored in the memory 129. In this case, the second offset value is varied from "0001" to "0000" (S302 in FIG. 6). The threshold value comparator 140 judges that the second offset value approaches the second threshold value, and thus, indicates the update of the first offset value and the second offset value to the update value generator 141.

The update value generator 141 updates the second offset value to the original value of "8" (if expressed by binary number, "1111" from "0000") and the first offset value to "1" (if expressed by binary number, "0001") from "3" (if expressed by binary number, "0011") by the subtraction of "2" ($=[8-0]/4$). As a result, the first offset value is set to "0001" and the second offset value is set to "1000" which are stored in the memory 129 (S303 in FIG. 6).

When the DC offset component is varied by "−1", the second offset value is varied from "8" (if expressed by binary number, "1000") to "7" (if expressed by binary number, "0111") and the first offset value is not varied and maintained as "1" (if expressed by binary number, "0001") (S304 in FIG. 6).

When the DC offset component is varied by "+1", the second offset value is varied from "7" (if expressed by binary number, "0111") to "8" (if expressed by binary number, "1000") and the first offset value is not varied and maintained as "1" (if expressed by binary number, "0001") (S305 in FIG. 6). Namely, in the case that the second offset value approaches to about the first threshold value and the second threshold value, the second offset value is set apart from the first threshold value and the second threshold value and the first offset value is increased and decreased. Therefore, the first offset value is not remarkably affected by the variation of the second offset value so that the remaining pulsed DC offset signal can not be input into the amplifier 114.

In this embodiment, since the correction value monitor 138 is provided, the variation of the first offset value can be reduced by controlling the memory value stored in the memory 129 through the addition of redundant bit as shown in FIG. 6 so that the receiving performance can be improved.

For comparison, the correction operation of the receiver without the correction value monitor will be described. Suppose that the gain of the amplifier 114 is set to "4" and the resolutions of the DACs 134 and 136 are set to 4 bits, respectively. The upper 4 bits of the memory value stored in the memory 129 are allotted to the first offset value and the lower 2 bits of the memory value are allotted to the second offset value because the gain of the amplifier 114 is set to "4" ($=2^2$). In this embodiment, the operation will be described concretely under the condition that the first offset value is set to "3" (if expressed by binary number, "0011") and the second offset value is set to "1" (if expressed by binary number, "0001") so that the total DC offset amount to be removed from the DC offset component is converged into a given value (S311 in FIG. 7).

Suppose that the DC offset component to be generated in the circuit of the receiver 1 is varied by "−1" due to the change in temperature, etc. and thus, the binary number stored in the memory 129 is varied from "001101" to "001100" through the switching of the data stored in the memory 129. In this case, the second offset value is varied from "1" (if expressed by binary number, "01") to "0" (if expressed by binary number, "00") (S312 in FIG. 7). In this case, when the DC offset component is also varied by "−1", the second offset value is varied from "0" (if expressed by binary number, "00") to "3" (if expressed by binary number, "11") and the first offset value is set to "2" (if expressed by binary number, "0010") (S313 in FIG. 7).

When the DC offset component is varied by "+1", the second offset value is varied from "3" (if expressed by binary number, "11") to "0" (if expressed by binary number, "00") and the first offset value is set to "3" (if expressed by binary number, "0011") (S314 in FIG. 7). In this way, if the second offset value is not corrected by the correction value monitor 138, the first offset value is varied remarkably in accordance with the slight variation of the DC offset component so that the receiving performance is deteriorated. In the embodiment according to the present invention, since the redundant bits are added to the second offset value, all of the bits constituting the second offset value are unlikely to be set to "1". When all of the bits constituting the second offset value are set to "1" or "0", the second offset value is updated within a range of the first threshold value through the second threshold value. Therefore, the first offset value is not varied even though the DC offset component is varied slightly.

Figure 8:
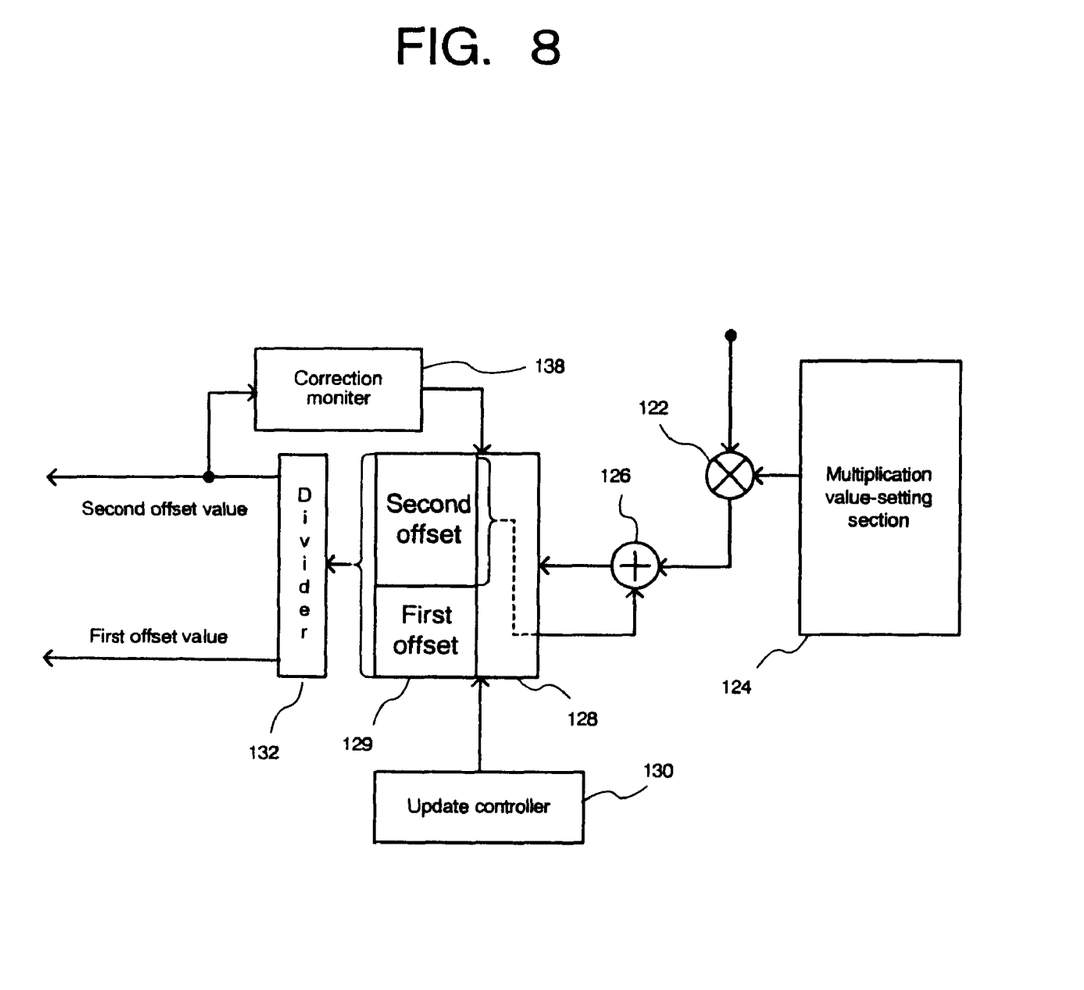
FIG. 8 is a block diagram relating to the memory controller in the receiver of the first embodiment.

Then, the memory controller 128 in the receiver 1 of the first embodiment will be described with reference to FIG. 8. FIG. 8 is a block diagram relating to the memory controller 128 in the receiver 1 of the first embodiment.

The memory controller 128 supplies the DC offset value read out from the memory 129 to the adder 126. As shown in FIG. 8, the memory controller 128 is configured so as to supply bits except the bits to be divided as the first offset value by the divider 132 to the adder 126. Since the adder 126 adds some (not all) bits constituting the memory value stored in the memory 120 to the digital signal output from the multiplier 122, the bit number to be calculated by the adder 129 can be reduced so as to simplify the structure of the circuit of the receiver 1.

Figure 9:
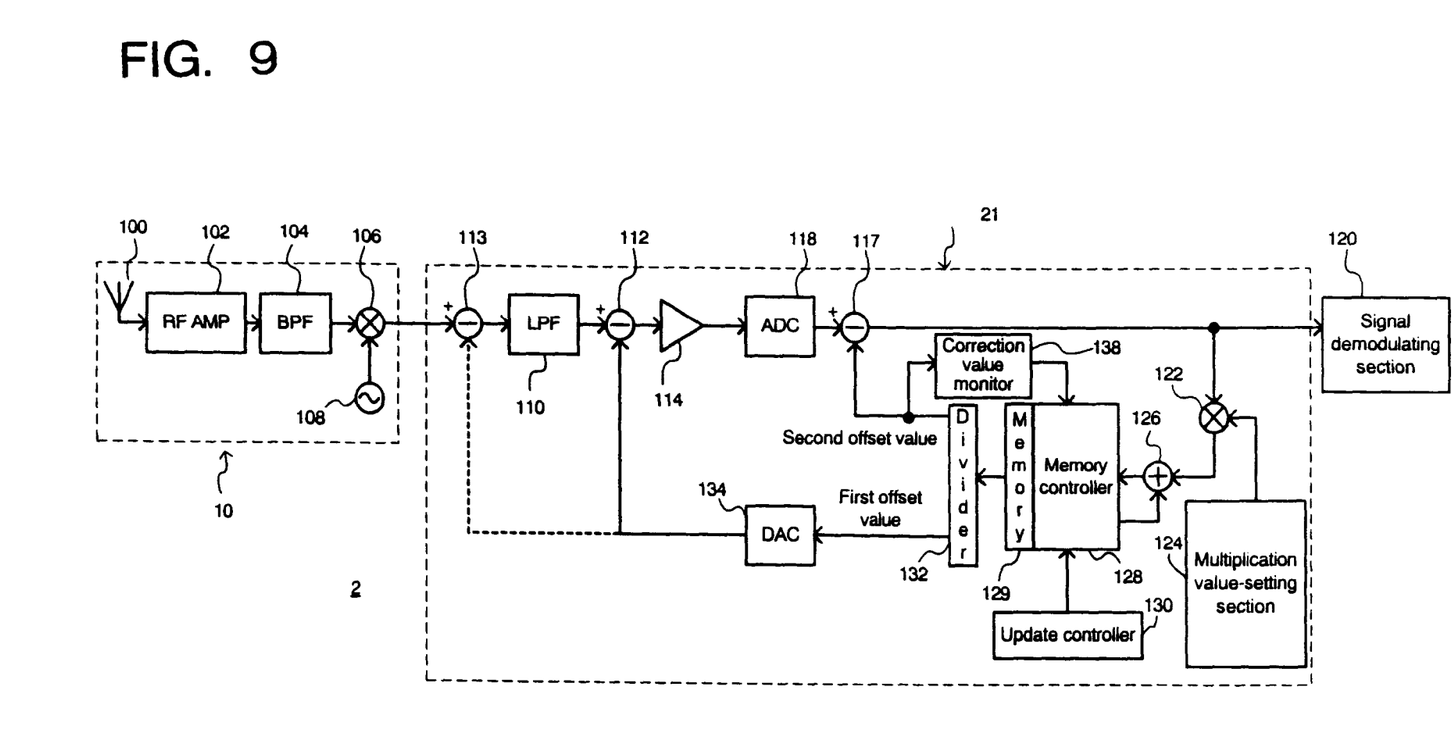
FIG. 9 is a block diagram relating to the structure of the receiver according to a second embodiment.

Then, a second embodiment will be described. FIG. 9 is a block diagram relating to the structure of the receiver according to the second embodiment. In the receiver 2 of this embodiment, as shown in FIG. 9, the subtracters 117, corresponding to the subtracter 116 in the first embodiment, is disposed at the output of the ADC 118, not the input of the ADC 118. Then, the DAC for the subtracter 117 is omitted. In this embodiment, the same function/effect as the first embodiment can be exhibited. Moreover, since the DC offset component can be removed digitally at the output of the amplifier 114, the DAC and the like may be omitted so that the circuit structure can be simplified. Herein, another subtracter may be provided at the input of the ADC 118 so that the DC offset component can be removed in two stages at the output of the amplifier 114.

Figure 10:
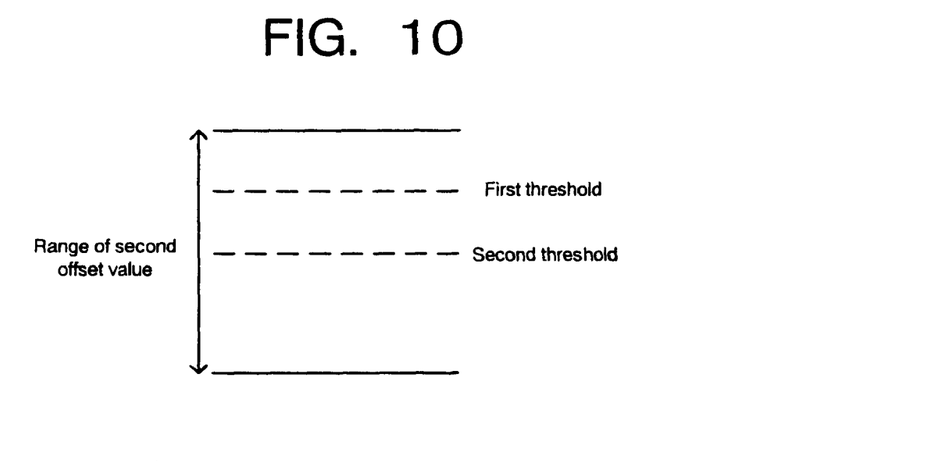
FIG. 10 is a view showing the relation between a first threshold value and a second threshold value in the receivers of the first embodiment and the second embodiment.
Figure 11:
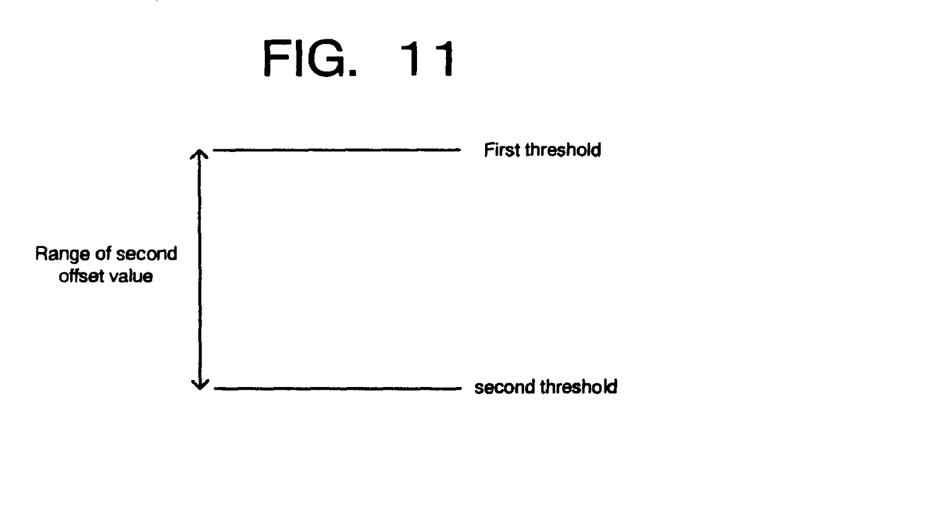
FIG. 11 is another view showing the relation between a first threshold value and a second threshold value in the receivers of the first embodiment and the second embodiment.
Figure 12:
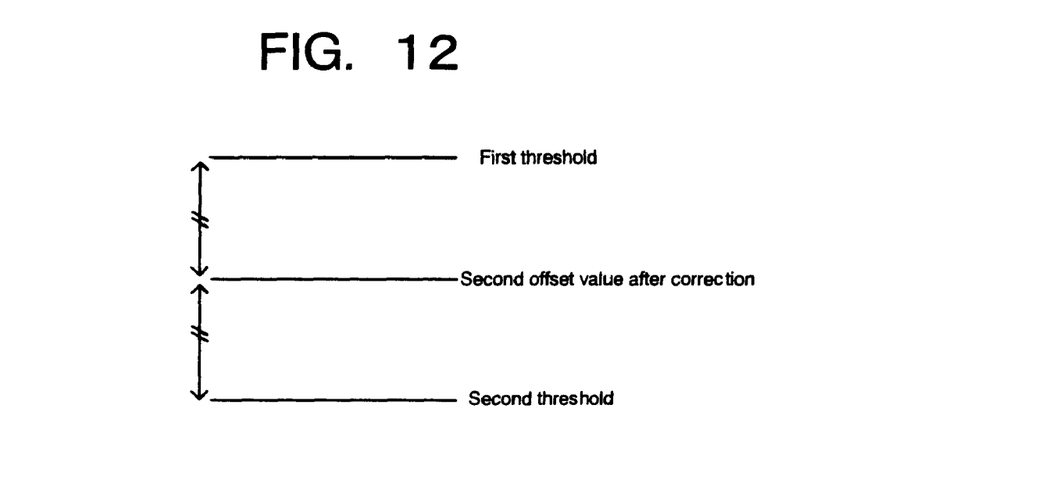
FIG. 12 is still another view showing the relation between a first threshold value and a second threshold value in the receivers of the first embodiment and the second embodiment.

Then, the relation between the first threshold value and the second threshold value in the receivers 1 and 2 of the first embodiment and the second embodiment will be described. FIGS. 10 to 12 are views showing the relation between the first threshold value and the second threshold value in the receivers 1 and 2 of the first embodiment and the second embodiment.

In FIG. 10, the first threshold value and the second threshold value are set within the dynamic range of the second offset value. In this case, the correction value monitor can enlarge the allowable margin of the dynamic range of the second offset value.

In FIG. 11, the first threshold value is set to the allowable maximum value of the second offset value and the second threshold value is set to the allowable minimum value of the second offset value. In this case, the dynamic range of the second offset value is defined by the bit number of the second DAC 136 when the DC offset component is removed by the analog DC offset amount at the subtracter 116 as in the first embodiment. On the other hand, the dynamic range of the second offset value is defined by the calculated bit number when the DC offset component is removed by the digital DC offset amount at the subtracter 117 as in the second embodiment. In the embodiments, since the first offset value is varied when the second offset value approaches to the first threshold value and the second threshold value, the variation of the first offset value can be reduced by increasing the difference between the first threshold value and the second threshold value. As shown in FIG. 11, when the first threshold value is set to the allowable maximum value of the second offset value and the second threshold value is set to the allowable minimum value of the second offset value, the difference between the first threshold value and the second threshold value can be maximum. Therefore, the variation of the first offset value can be reduced so that the receiving performance can be improved.

FIG. 12 shows the state that the second offset value is set to the intermediate value between the first threshold value and the second threshold value when the second offset value is beyond the first threshold value or below the second threshold value. Namely, the second offset value is set to the intermediate value between the first threshold value and the second threshold value through the subtraction/addition at S254 and S259 in FIG. 4. In this case, the difference between the second offset value and the first threshold value or the second threshold value becomes maximum. Therefore, the variation of the first offset value can be reduced so that the receiving performance can be improved.

In the first embodiment and the second embodiment, since the DC offset value stored in the memory is varied in accordance with the second offset value in the receiver configured so as to remove the DC offset component before and after the amplifier, the variation of the first offset value originated from the variation of the second offset value can be reduced. Also, the remaining DC offset component originated from the resolution of the DAC can be removed by using the second offset value so that the receiving performance can be improved.

Figure 13:
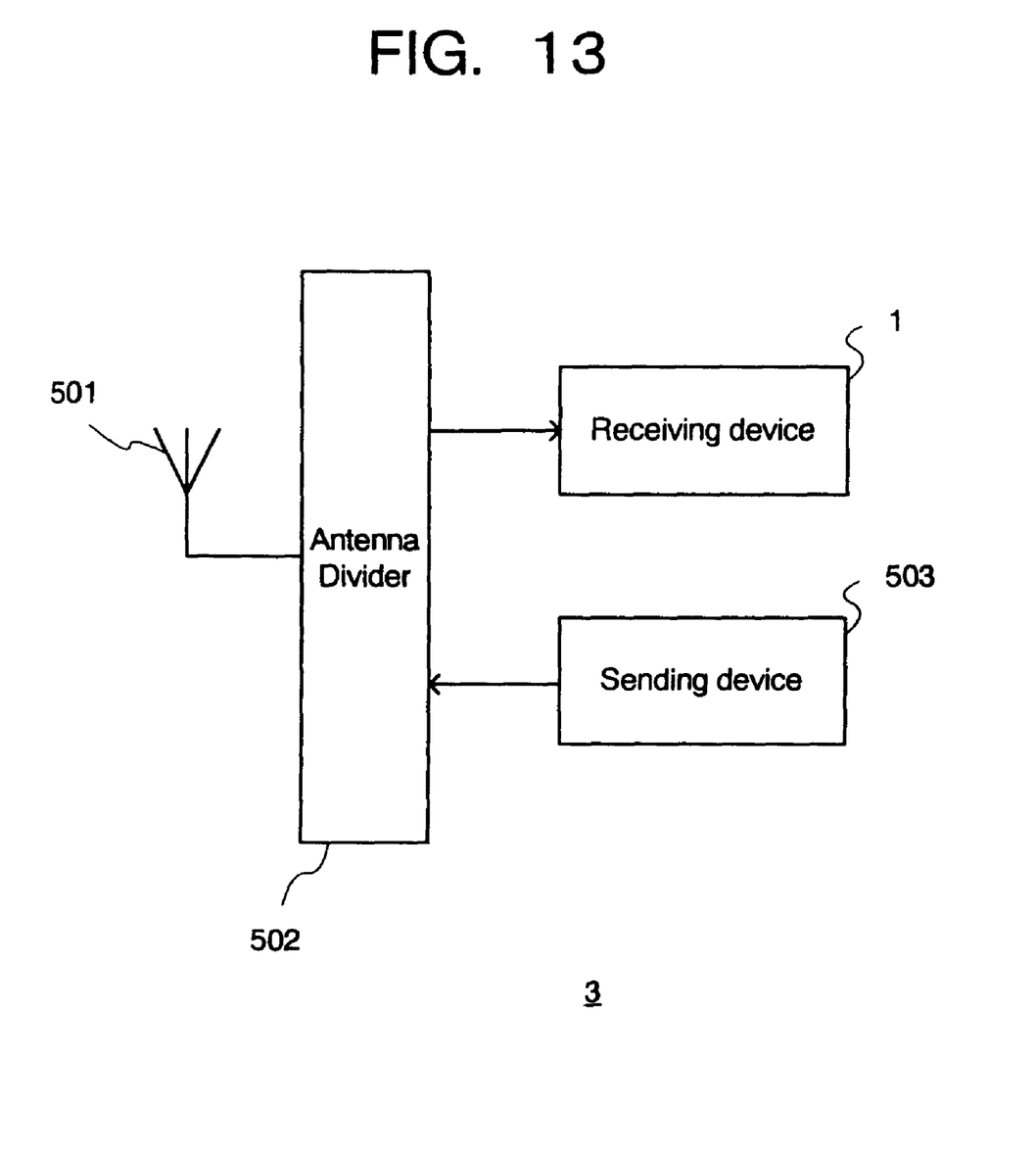
FIG. 13 is a block diagram relating to the structure of the wireless device according to a third embodiment.

Then, a third embodiment will be described. FIG. 13 is a block diagram relating to the structure of the wireless device according to the third embodiment. As shown in FIG. 13, the wireless device 3 in this embodiment includes an antenna 501, an antenna divider 502 to divide a transmitter signal and a receiver signal, the receiver 1 in the first embodiment and a transmitter 503 coupled with the receiver 1. According to the wireless device 3, since the receiver 1 is provided, the DC offset component can be removed finely. Herein, the receiver 2 in the second embodiment may be employed instead of the receiver 1.

Although the present invention was described in detail with reference to the above examples, this invention is not limited to the above disclosure and every kind of variation and modification may be made without departing from the scope of the present invention. For example, some components in the embodiments may be combined with one another to form a new receiver and the like within the scope of the present invention. Moreover, one or more components in the embodiments may be omitted. Then, a π/2 phase shifter may be provided in addition to the local oscillator. Also, two baseband signal processing unit may be provided as an I channel signal processing unit and a Q channel signal processing unit so that the I channel signal and the Q channel signal can be demodulated.

What is claimed is:

1. A receiver comprising:
 a memory for storing DC offset amounts generated by an analog circuit;
 an amplifier for amplifying a received signal;
 a DC offset amount generator for generating a first offset value to be removed from said received signal amplified at said amplifier and a second offset value to be removed from said received signal after said amplifier in combination with said DC offset amount stored in said memory;
 a first DC offset component-removing unit for removing said first DC offset value from said received signal before said amplifier;
 a second DC offset component-removing unit for removing said second DC offset value from said received signal amplified at said amplifier; and
 an updating unit for updating said DC offset amount stored in said memory in view of said second DC offset value generated by said DC offset amount generator;
 wherein a maximum value of said second DC offset value generated at said DC offset amount generator is set larger than a multiplication value of a gain of said amplifier by a minimum resolution value of said first DC offset value.

2. The receiver as set forth in claim 1, further comprising:
an A/D converter for digitally converting a signal output from said second DC offset component-removing unit;
an adder for adding said signal digitally converted by said A/D converter to one of said DC offset amounts stored in said memory; and
a controller for storing said signal added by said adder as one of said DC offset amounts into said memory.

3. The receiver as set forth in claim 1,
wherein said updating unit is configured such that when said second DC offset value generated by said DC offset amount generator approaches to a given threshold value, said first DC offset value and said second DC offset value are updated and stored as said DC offset amounts in said memory.

4. The receiver as set forth in claim 1,
wherein said updating unit is configured such that when said second DC offset value generated by said DC offset amount generator approaches to an upper limit threshold value, said second DC offset value is decreased to a predetermined value and said first DC offset value is increased by a given value.

5. The receiver as set forth in claim 3,
wherein said updating unit is configured such that when said second DC offset value generated by said DC offset amount generator approaches to an lower limit threshold value, said second DC offset value is increased to a predetermined value and said first DC offset value is decreased by a given value.

6. The receiver as set forth in claim 3,
wherein said given threshold value is set within a dynamic range of said second offset value.

7. The receiver as set forth in claim 6,
wherein said given threshold value is set to an allowable maximum value of said second offset value within said dynamic range.

8. The receiver as set forth in claim 6,
wherein said given threshold value is set to an allowable minimum value of said second offset value within said dynamic range.

9. The receiver as set forth in claim 1,
wherein said second offset value contains a redundant bit if expressed by binary number.

10. A wireless device, comprising;
a receiver as defined in claim 1 for receiving a given receiver signal;
a transmitter for transmitting a given transmitter signal and coupled with said receiver; and
an antenna for receiving said receiver signal and transmitting said transmitter signal.

11. A receiver comprising:
a memory for storing DC offset amounts generated by an analog circuit in accordance with a DC offset component remaining in a received signal;
an amplifier for amplifying said received signal;
an A/D converter for digitally converting said received signal amplified by said amplifier;
a DC offset amount generator for generating a first offset value to be removed from said received signal before said amplifier and a second offset value to be removed from said received signal after said amplifier in combination with said DC offset amount stored in said memory;

a D/A converter for converting said first DC offset signal generated by said DC offset value generator into the corresponding analog signal;
a first DC offset component-removing unit for removing said first DC offset value from said received signal before said amplifier;
a second DC offset component-removing unit for removing said second DC offset value from said received signal after said amplifier; and
an updating unit for updating said DC offset amount stored in said memory in view of said second DC offset value generated by said DC offset amount generator;
wherein a maximum value of said second DC offset value generated at said DC offset amount generator is set larger than a multiplication value of a gain of said amplifier by a minimum resolution value of said first DC offset value.

12. A method for cancelling a DC offset component, comprising;
storing, in a memory, DC offset amounts generated by an analog circuit in accordance with a DC offset component remaining in a received signal;
amplifying said received signal by an amplifier;
generating a first offset value to be removed from said received signal before said amplifier and a second offset value to be removed from said received signal after said amplifier in combination with said DC offset amount stored in said memory;
removing said first DC offset value from said received signal before said amplifier;
removing said second DC offset value from said received signal after said amplifier; and
updating said DC offset amount stored in said memory in view of said second DC offset value generated by said DC offset amount generator;
wherein a maximum value of said second DC offset value generated at said DC offset amount generator is set larger than a multiplication value of a gain of said amplifier by a minimum resolution value of said first DC offset value.

13. The method as set forth in claim 12, further comprising:
digitally converting a signal output from said second DC offset component-removing unit by an A/D converter;
adding said signal digitally converted by said A/D converter to one of said DC offset amounts stored in said memory by an adder; and
storing said signal added by said adder as one of said DC offset amounts into said memory by a controller.

14. The method as set forth in claim 12,
wherein when said second DC offset value generated by said DC offset amount generator approaches to a given threshold value, said first DC offset value and said second DC offset value are updated and stored as said DC offset amounts in said memory.

15. The method as set forth in claim 12,
wherein when said second DC offset value generated by said DC offset amount generator approaches to an upper limit threshold value, said second DC offset value is decreased to a predetermined value and said first DC offset value is increased by a given value.

16. The method as set forth in claim 12,
wherein when said second DC offset value generated by said DC offset amount generator approaches to an lower limit threshold value, said second DC offset value is increased to a predetermined value and said first DC offset value is decreased by a given value.

17. The method as set forth in claim 14,
wherein said given threshold value is set within a dynamic range of said second offset value.

18. The method as set forth in claim 17,
wherein said given threshold value is set to an allowable maximum value of said second offset value within said dynamic range.

19. The method as set forth in claim 17,
wherein said given threshold value is set to an allowable minimum value of said second offset value within said dynamic range.

20. The method as set forth in claim 12,
wherein said second offset value contains a redundant bit if expressed by binary number.

* * * * *